Aug. 19, 1969  C. VAN DER LELY ET AL  3,461,578
V-PLOW WITH HITCH

Filed Jan. 4, 1966  4 Sheets-Sheet 2

INVENTORS
C. VAN DER LELY
I. A. MACKINNON
BY
Mason, Mason & Albright
Attorneys

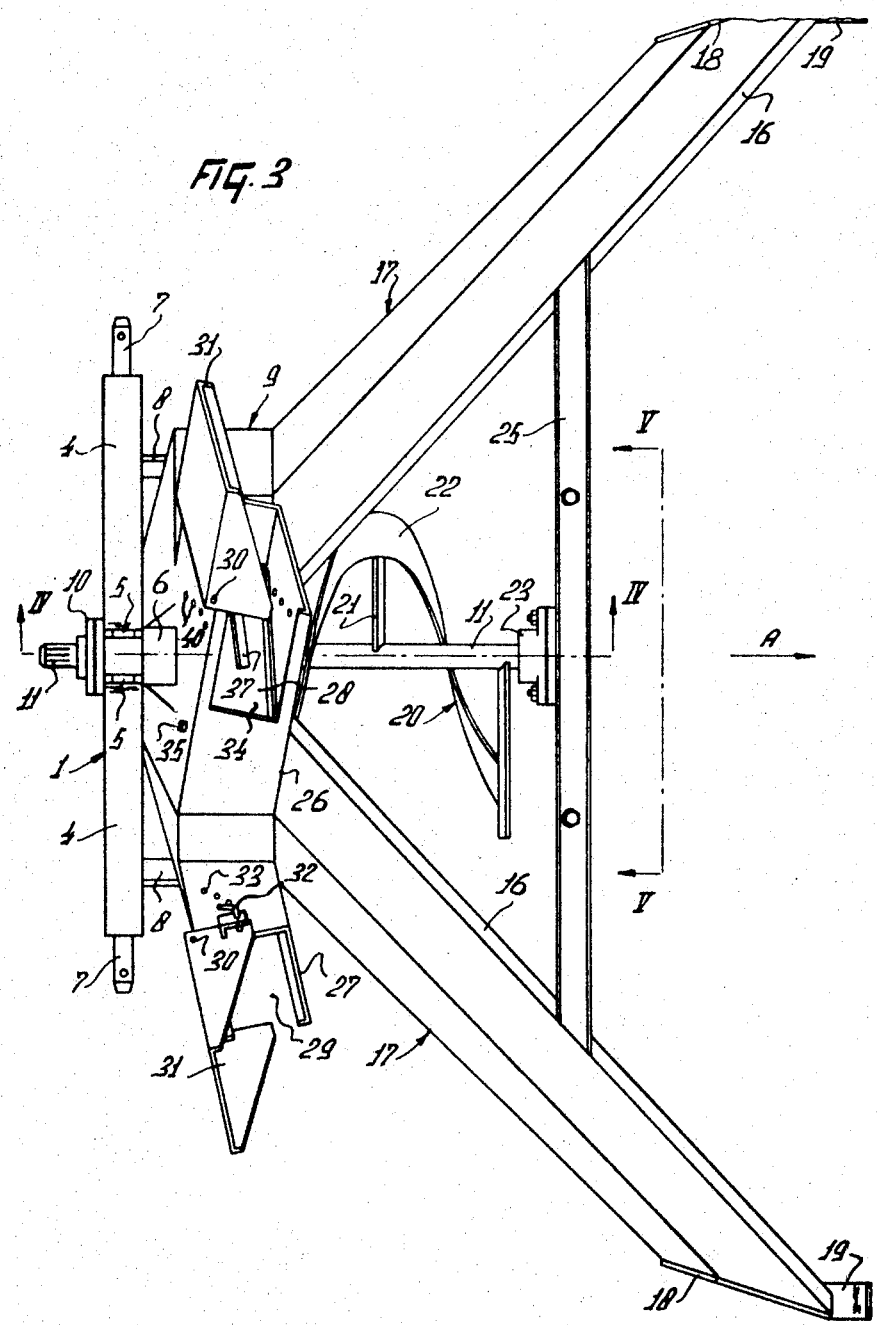

United States Patent Office 3,461,578
Patented Aug. 19, 1969

3,461,578
V-PLOW WITH HITCH
Cornelis van der Lely, Zug, Switzerland, and Ian Archie MacKinnon, Streetsville, Ontario, Canada, assignors to C. van der Lely N.V., Maasland, Netherlands, a Dutch limited-liability company
Filed Jan. 4, 1966, Ser. No. 518,597
Claims priority, application Netherlands, Jan. 6, 1965, 6500070
Int. Cl. E01h 5/09; A01b 59/048
U.S. Cl. 37—43                                      4 Claims

ABSTRACT OF THE DISCLOSURE

A snow plow structure having a collector with a fan positioned at the rear of the plow. A conveyor leads from the forward part of the plow to a discharge fan. The fan has a housing on which a hitch is mounted. The hitch can be coupled to the three point lifting device of a tractor so that the lower two hitching points are lower than the conveyor.

---

This invention relates to snow plows of the kind comprising a supporting structure movable over the ground and a collecting member for snow to be cleared.

An object of the invention is to increase the efficiency of snow plows of this kind.

According to the invention, there is provided a snow plows of the kind set forth, wherein the collecting member accommodates a worm conveyor whose longitudinal axis is parallel or approximately parallel to the intended direction of operative travel of the snow plow, the conveyor being arranged for feeding snow to a discharge fan located at its rear relative to said direction.

Figure 1:
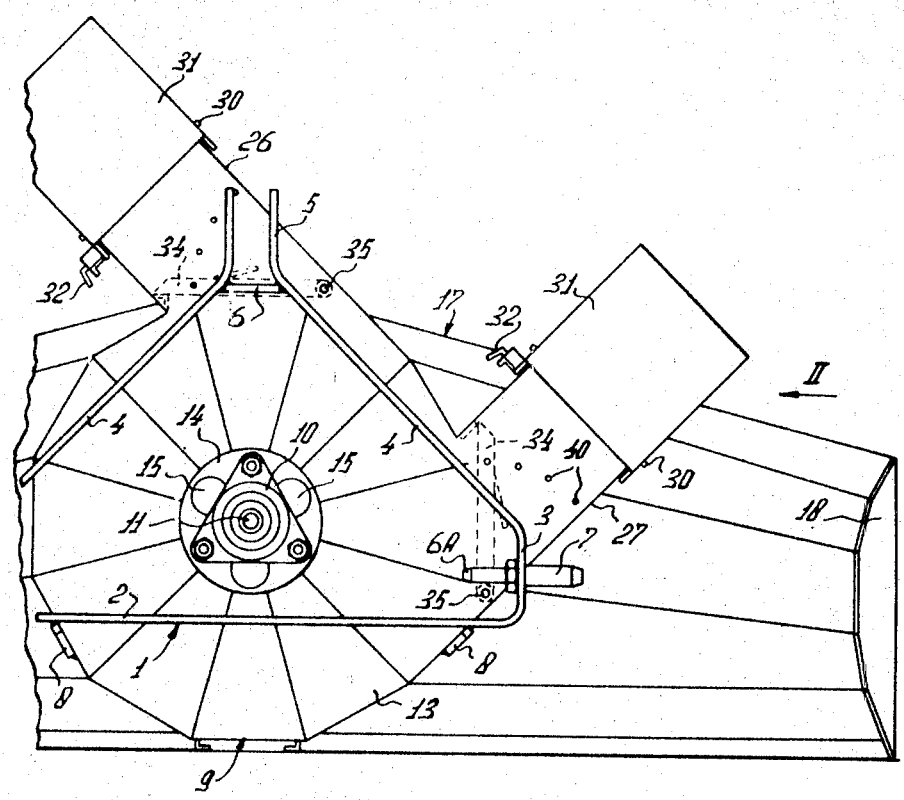
Figure 2:
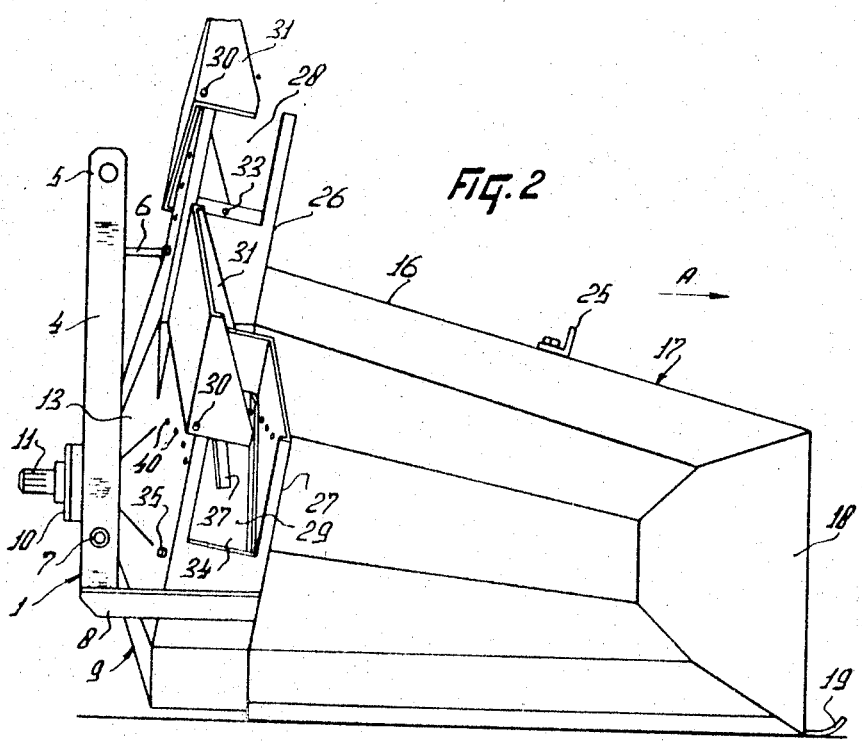
Figure 6:
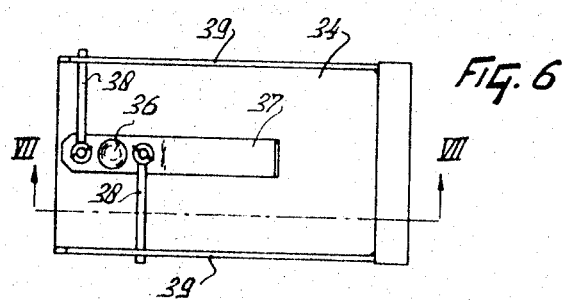
Figure 7:
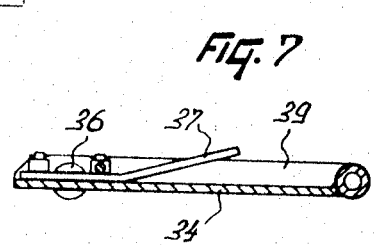
Figure 4:
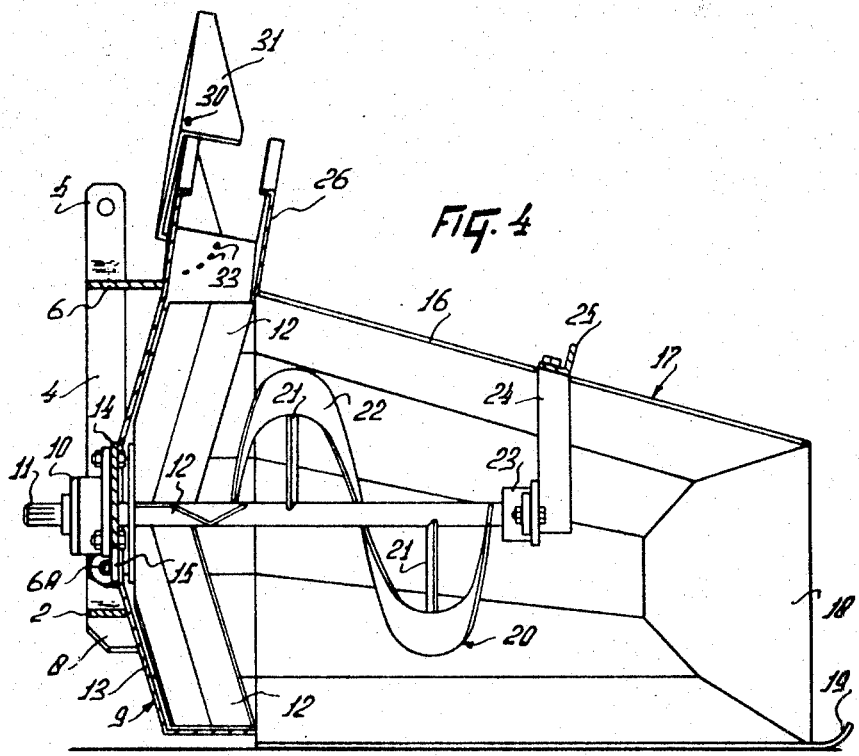
Figure 5:
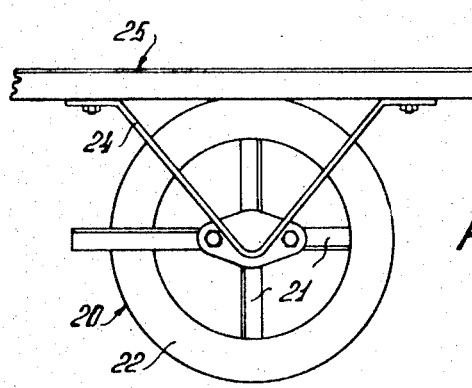

For a better understanding of the invention, and to show how the same may be carried into effect, reference will now be made, by way of example, to the accompanying drawings, in which:

FIGURE 1 is a rear elevation of a snow plow in accordance with the invention,

FIGURE 2 is a side elevation as seen in the direction indicated by the arrow II of FIGURE 1, FIGURE 3 is a plan view corresponding to FIGURES 1 and 2, FIGURE 4 is a vertical section taken on the line IV—IV of FIGURE 3, FIGURE 5 is a fragmentary front view as seen in the direction indicated by the arrows V—V of FIGURE 3, FIGURE 6 is a fragmentary view showing part of the snow plow to an enlarged scale and in greater detail, and FIGURE 7 is a section taken on the line VII—VII of FIGURE 6.

Referring to the drawings, the snow plow which is illustrated has a supporting structure which is generally indicated by the reference numeral 1 and which comprises a substantially horizontal strip 2 that extends perpendicular to the intended direction of operative travel of the snow plow but the plane of which is substantially parallel to said direction. The opposite ends of the strip 2 are bent over upwardly to form vertical portions 3 the uppermost ends of which merge into upwardly converging portions 4. The adjacent uppermost ends of the portions 4 merge into relatively parallel vertical portions 5. The two junctions between the converging and vertical portions 4 and 5 are interconnected by a horizontal strip 6 of greater width than the strip which affords most of the supporting structure 1. Each of the vertical portions 3 carries a pair of horizontal pins 6A and 7, said pins projecting in relatively opposite directions from the strip portions 3 and the pins 7 being of greater diameter than the pins 6A.

Strips 8 project forwardly from the horizontal strip 2 in the intended direction of operative travel of the snow plow from locations disposed close to, and at equal distances from, the opposite ends of the strip 2. The strips 8 support a fan housing 9 which, as can be seen in FIGURE 1, is of dodecagonal shape. It is not, in fact, important that the fan housing 9 should be dodecagonal and it may be of any other convenient polygonal shape. A horizontal bearing 10 is mounted centrally of the housing 9 and a horizontal shaft 11 that extends internally of the housing 9 is journalled in said bearing. Inside the housing 9, the shaft 11 carries four fan blades 12 each of which is gently inclined forwardly of the snow plow from its root so that the free ends of the four blades 12 that are furthest from the shaft 11 are located further forward of the snow plow than are the roots of the blades. It can be seen from FIGURE 4 of the drawings that the fan blades 12 have a shallow V-shaped cross-section.

The fan housing 9 has a rear wall 13 which includes a plate 14 formed with three inlet holes 15 for the supply of air to the fan. Walls 16 that form part of a collecting member generally indicated by the reference numeral 17 diverge forwardly from the fan housing 9 and are located at opposite sides of said housing with their rearmost ends fastened to the housing. Each of the walls 16 is afforded by a plate bent so as to have a number of adjoining and relatively inclined uni-planar portions, the leading ends of these portions matching the side surfaces of the dodecagonal fan housing 9 to which they are fastened. Thus, each side wall 16 is of concave configuration, the arrangement being such that, in plan view, the upper and lower uni-planar portions of each side wall substantially coincide and are both located in front, with respect to the intended direction of operative travel of the snow plow, of the central uni-planar portion of the same side wall 16.

It can be seen from FIGURE 2 of the drawings that the height of the side walls 16 progressively decreases from the rear to the front of the collecting member 17. The leading ends of the two side walls 16 terminate in vertical plates 18 the planes of which are only gently inclined to the intended direction of operative travel of the snow plow. The lowermost edge of each side wall 16 and the corresponding vertical plate 18 is provided with a shoe 19, the two shoes 19 extending substantially parallel to, the intended direction of operative travel.

The shaft 11 carries a worm conveyor that is generally indicated by the reference numeral 20. The rearmost end of the worm conveyor 20 is located just inside the fan housing 9 while its leading end is located well forward from said housing between the two side walls 6. The conveyor 20 comprises a strip 22 which is wound helically around the shaft 11 but in spaced relation to that shaft. Arms 21 connect the strip 22 to the shaft 11, the length and configuration of the strip 22 being such that its total length subtends an angle of approximately 360° around the longitudinal axis of the shaft 11. The diameter of the worm conveyor 20 is fixed throughout its length and is preferably not less than half the diameter of the fan located behind it. As can be seen in FIGURE 4 of the drawings, the rearmost end of the worm conveyor 20 is disposed at approximately the same point, relative to the intended direction of operative travel of the snow plow, as are the free ends of the four fan blades 12.

The leading end of the shaft 11 that is remote from the bearing 10 is rotatably mounted in a second horizontal bearing 23 fastened to a V-shaped bracket 24 (FIGURE 5) that depends from a horizontal beam 25 of L-shaped cross-section. The beam 25 extends perpendicular to the intended direction of operative travel of the snow plow and interconnects approximately the midpoints of the uppermost edges of the two side walls 16.

The fan housing 9 is directly secured to the supporting structure 1 and also indirectly by way of the strips 6 and 8. The housing 9 has two outlets 26 and 27 which are arranged so that their longitudinal axes are inclined to one another at an angle of about 90°. It will be evident from FIGURE 1 of the drawings that the two outlets are directed towards the left and right respectively of the path of travel of the snow plow. Side walls of the two outlets 26 and 27 are formed with rectangular cut-outs 28 and 29 (FIGURE 2) respectively and each outlet is provided, adjacent its mouth, with a corresponding guide flap 31 that is angularly displaceable about a corresponding pivot shaft 30. The side of each guide flap 31 carries a corresponding spring-loaded locking pin 32 the tip of which can be entered in any one of a number of different holes 33 (FIGURE 3) formed in an adjacent wall of the corresponding outlet 26 or 27 at equal distances from the corresponding shaft 30. It will be evident that the hole 33 chosen for co-operation with the locking pin 32 determines the angular setting of the corresponding guide flap 31 about its pivotal shaft 30.

The two outlets 26 and 27 both have rectangular cross-sections throughout their lengths and, at their junctions with the fan housing 9, shutters 34 are provided, the shutters 34 being angularly adjustable about corresponding pivots 35. The side of each shutter 34 which is furthest from the shaft 11 has a lever 37 pivotally connected to it with the aid of a loose rivet 36 (FIGURES 6 and 7). The levers 37 each have a pair of locking pins 38 pivotally connected to them close to, but at relatively opposite sides of, the corresponding loose rivet 36. Each lever 37 has a handle portion that is inclined to the general plane of the corresponding shutter 34. Each shutter 34 has opposite perpendicularly bent-over edges 39 through holes in which end portions of the two locking pins 38 remote from their pivotal connections with the lever 37 are entered. The tips of the two locking pins 38 are adapted to be entered through chosen holes 40 formed in opposite walls of the outlets 26 and 27 at equal distances from the corresponding pivots 35. It will be evident from FIGURE 1 of the drawings that each shutter 34 can be locked in a position in which it fully closes the corresponding outlet, a position in which the corresponding outlet is fully open or either one of two intermediate positions. It can be seen from FIGURE 2 that the two levers 37 are readily accessible for engagement and disengagement of the locking pins 38 by way of the aforementioned rectangular cut-outs 28 and 29. It will be evident that the rectangular cut-outs 28 and 29 do not pass any appreciable quantities of snow during use of the snow plow since they are closed by the shutters 34 to a greater or lesser extent depending upon the angular settings of those shutters about the pivots 35.

The rearmost projecting end of the shaft 11 is splined or otherwise keyed and is adapted to be placed in driven engagement with the power take-off shaft of an agricultural tractor or other propelling vehicle by way of an intermediate shaft having universal joints at its opposite ends. The snow plow is supported by the three-point lifting device of the same agricultural tractor or other vehicle which drives its shaft 11 and which propels it over the snow. The free ends of the two lower lifting links of the lifting device can be engaged with either the pins 6A or the pins 7 while the free end of the upper adjustable lifting link is engaged with holes formed in the parallel portions 5 of the supporting structure 1 by means of a horizontal pivot pin. Obviously, it is desirable that the agricultural tractor or other vehicle which is used should have its lifting device at its leading end or, alternatively, that it should be of a kind which can be driven at a range of different speeds in the conventional "reverse" direction with the driver's seat facing in that direction.

The snow plow is propelled in the direction indicated by the arrow A in FIGURES 2 and 3 and snow that is embraced between the side walls 16 of the collecting member 17 is urged by the rotating worm conveyor 20 into the center of the fan. The fan blades 12 discharge the snow, together with air derived from the inlet holes 15 through the outlets 26 and 27. The guide flaps 31 can be adjusted to alter the direction of discharge of the snow in accordance with prevailing wind and other conditions and, when required, the shutters 34 can be employed to completely or partially close one of the two outlets. It will be evident that occasions will arise in which discharge of snow to one or other side of the path of travel of the snow plow is not desired.

What we claim is:

1. A snow plow including a collecting member, a rotatable worm conveyor mounted within said collecting member, said conveyor being rotatable about an axis substantially parallel to the direction of travel, a single discharge fan mounted in a housing in the rearward portion of said collecting member for receiving snow from said conveyor, hitch means connected adjacent the rear of said collecting member for coupling said plow with the three point lifting device of a tractor whereby said plow is connected to be pushed by the tractor, said hitch means comprising lower coupling points which are located beneath the axis of rotation of said conveyor and said hitch means comprising a tringular hitch support mounted on said housing for said fan, said fan housing being funnel-shaped whereby when viewed in a direction perpendicular to the direction of travel of said plow, the center of the said housing is located within the space defined by said triangular hitch means.

2. A snow plow as claimed in claim 1, wherein said hitch support is coupled to said housing in at least two points.

3. A snow plow as claimed in claim 2, wherein said coupling points, viewed in the direction of travel of said plow, are located outside the periphery of said fan housing.

4. A snow plow as claimed in claim 1, wherein the lower side of the said triangular hitch support is coupled to said fan housing at two spaced-apart points.

References Cited

UNITED STATES PATENTS

| | | | |
|---|---|---|---|
| 2,880,527 | 4/1959 | Merry | 37—43 |
| 2,154,353 | 4/1939 | Ploetz | 37—43 |
| 3,296,717 | 1/1967 | Sedore | 37—43 |
| 2,411,490 | 11/1946 | Williams | 302—37 |
| 2,619,746 | 12/1952 | Heaman | 37—43 |
| 2,679,702 | 6/1954 | Berger | 37—43 |
| 2,974,735 | 3/1961 | Smith et al. | 37—92 |
| 3,164,913 | 1/1965 | Hanson | 37—43 |
| 3,353,286 | 11/1967 | Marks | 37—43 |

FOREIGN PATENTS 640,135   4/1962   Canada.

ROBERT E. PULFREY, Primary Examiner

E. N. EICKHOLT, Assistant Examiner

U.S. Cl. X.R.

172—276